United States Patent Office 2,842,532
Patented July 8, 1958

2,842,532

PROCESS OF REDUCING THE VISCOSITY OF POLYMERS

Ted W. Campbell, Wilmington, Del., assignor to E. I. du Pont de Nemours and Company, Wilmington, Del., a corporation of Delaware No Drawing. Application October 23, 1956
Serial No. 617,696

7 Claims. (Cl. 260—93.7)

The present invention relates to a process of making highly oriented fibers, and more particularly it relates to a process of making poly(4-methyl-1-pentene) fibers of excellent properties.

Poly(4-methyl-1-pentene) has been described before as a high melting crystalline polymer but fibers were prepared from it only by complicated processes and were of poor physical properties. The reason for this is that poly(4-methyl-1-pentene), as prepared using the usual coordination catalyst, is obtained with a molecular weight too high for melt extrusion, and giving solutions with too high viscosity for smooth spinning. A number of methods applicable to vinyl polymerization systems have been employed to lower the molecular weight of poly(4-methyl-1-pentene) from the undesirable range of inherent viscosities equal to 4.0–6.0 to the desirable range of 0.8–1.6. All of these resulted in polymers of lower average molecular weight, but only, or mainly, by increasing the percentage of grease in the as-formed polymer. These products could be spun readily, but the fibers had poor tensile properties. Removal of grease gave crystalline polymer, again too viscous for melt spinning.

The present invention has as one of its objectives a process of converting poly(4-methyl-1-pentene) and closely related polymers into a high quality filamentary material. Another objective is the preparation of poly(4-methyl-1-pentene) having a uniform inherent viscosity suitable for melt spinning. A further object is the provision of a poly(4-methyl-1-pentene) fiber of superior tensile properties. Other objects will appear hereinafter.

These objects are accomplished by cracking poly(4-methyl-1-pentene) and closely related polymers by a controlled thermal process and fractionating the polymer by solvent extraction to yield a polymer with low enough molecular weight as indicated by its inherent viscosity to permit melt extrusion and high enough to yield fibers of excellent physical properties unmatched by any previous process. The inherent viscosities after treatment are in the range of about 0.8 to 1.6 and preferably from 1.0 to 1.3 as determined in a .5% solution of the polymer in decahydronaphthalene at 130° C. and 1% of an antioxidant. The polymer so obtained extrudes smoothly and can be drawn 8–13 times its as-spun length to yield a highly oriented crystalline filament. The thermal cracking process is carried out at a temperature of about 250°C. to 310° C. and preferably between about 270° C.–290° C. for a time necessary to give a lower molecular weight polymer without disturbing the ratio of grease to crystalline portions and without any loss in the high quality of the polymer except the reduction of its inherent viscosity into a suitable range for dry spinning. It usually takes about 2 to 12 hours for cracking the polymer at 270° C.–290° C. depending on the inherent viscosity of the polymer before cracking and the inherent viscosity desired after cracking. The extraction with a suitable solvent removes the grease portion from the cracked or uncracked polymer and, once removed, will leave a polymer of relatively uniform molecular weight. The grease-free polymer is highly crystalline and orientable.

This extraction can be carried out with various solvents. A number of solvents, such as petroleum ether, acetone, cyclohexane, etc. will dissolve the amorphous portions of the polymer, whereas the crystalline fraction is insoluble. Thus a simple means produces the desirable result of separating amorphous, greasy polymer from the crystalline fraction.

The present invention is illustrated by reference to the following examples which are meant to be illustrative only and not limiting in any respect. In these examples, the inherent viscosities were all measured in a 0.5% concentration of the polymer decahydronaphthalene at 130° C. together with 1% of an antioxidant.

EXAMPLE I

A catalyst suspension was prepared from 100 cc. lithium aluminum tetradecyl (0.18 mol) and 1.7 cc. titanium tetrachloride. The catalyst components were pre-cooled to 0° C. before mixing. To this was added 400 cc. cyclohexane at room temperature, followed by the addition of 50 cc. of 4-methyl-1-pentene. The polymerization was allowed to proceed for twenty-four hours at autogenous pressure and temperature to yield 77% polymer of an inherent viscosity of 2.3 after precipitating the polymer with alcohol and drying.

EXAMPLE II

This example demonstrates the effect of the two operations, thermal cracking and extracting, carried out on different samples, in the process of rendering the polymer spinnable.

(a) The polymer of Example I was molded into a plug and spun through an orifice of 0.030 inch diameter at a temperature of 280° C. Only a very slow extrusion speed could be reached and the fibers so obtained were drawn at 175° C. to 8×. The fiber had a tenacity of 2.2 grams per denier, an elongation of 23%, and an initial modulus of 24 grams per denier.

(b) 30 grams of a polymer made by the process of Example I was extracted with petroleum ether. 11 grams of material dissolved, the remaining 19 grams remained insoluble. The insoluble material was crystalline and had an inherent viscosity of about 3.0, while the extracted material had a viscosity of about 0.5 and was completely amorphous.

(c) A 30 gram sample of a polymer made by the process of Example I was molded into a plug and heated at below 1 mm. Hg pressure at 275° C. for about 6 hours. The resulting polymer had an inherent viscosity of 1.35. This cracked polymer was ground up in a Wiley mill to a fine powder. This powder was extracted with petroleum ether to give 10 grams of a soluble polymer of an inherent viscosity of 0.20, and an insoluble polymer with an inherent viscosity of 1.6, which could be spun satisfactorily through a 0.02 inch diameter orifice at 175° C. to give, after drawing, a tougher fiber than the one from uncracked polymer.

The example shows that by combining the two operations a polymer of much better spinnability could be isolated.

EXAMPLE III

A 4-methyl-1-pentene polymer with an inherent viscosity of 2.3 was cracked as in Example II(c) to a polymer with an inherent viscosity of 1.35. This unextracted polymer was molded into a plug at 265° C. at 2,000 p. s. i. and the plug spun under the conditions described in Example II(a) through a 0.015 inch diameter orifice. The fibers were drawn 13× at 140° C. which represents the highest obtainable draw ratio. The fibers obtained in this manner have a tenacity of 2.4 grams per denier, an elongation of 26%, and an initial modulus of 17 grams per denier. The work recovery at 5% elongation was 41%; tensile recovery at 3% elongation was 65%. The polymer, used in this example, was prepared according to Example I, but, due to the lower inherent viscosity, was more easily spinnable by melt-extrusion.

EXAMPLE IV 275 grams poly(4-methyl-1-pentene) with an inherent viscosity of 2.3 was thermally cracked at 275° C. to a polymer of inherent viscosity 1.35, according to Example II(c). This cracked polymer was extracted repeatedly with cold cyclohexane which removed 125 grams of soluble amorphous material with an inherent viscosity of about 0.5. The residual, insoluble crystalline polymer had an inherent viscosity of 1.90. This crystalline material was cracked further by heating it to 288° C. for seven hours. The resulting product, still crystalline and free from grease, has an inherent viscosity of 1.24. It was ground up and molded into plugs which were then spun at 250° C. through a 0.015 inch spinneret. The filaments spun smoothly under these conditions with good continuity throughout the entire operation. Fiber samples were prepared by drawing the as-spun filament 12× at 155° C. These fibers have a tenacity of 5.1 grams per denier with an elongation of 25% and an initial modulus of 35 grams per denier. The fiber sticking temperature was about 215° C. and the crystalline melting point about 240° C.

The fibers of this example, compared with the ones in Example II, demonstrate far better tensile properties, although the same polymer was used as starting material. The high tenacity was induced by the removal of the grease fraction between the two cracking processes.

EXAMPLE V

The following experiment was designed to investigate a control of the thermal cracking. A plug of poly(4-methyl-1-pentene) having an inherent viscosity of 4.3 was cut up into 5 approximately equal pieces. These were heated separately at 305° C. (by using a benzophenone vapor bath) under various conditions. The conditions and results are summarized in the following table:

Table

|     | Conditions          | Inh. Vis. | Comments                                       |
| --- | ------------------- | --------- | ---------------------------------------------- |
| (a) | Control             | 4.3       | Off white.                                     |
| (b) | 1.0 hour in air     | 0.5       | Serious charring, especially at exposed surfaces. |
| (c) | 1.0 hour in nitrogen| 0.6       | Slight discoloration.                          |
| (d) | 3.0 hours in air    | 0.4       | Profound charring.                             |
| (e) | 3.0 hours in nitrogen| 0.6      | Slight discoloration.                          |

The example shows that at a temperature as high as 305°, only a short cracking time is required, and that the absence of oxygen is essential, if an uncharred polymer is desired.

EXAMPLE VI

Polymer plugs from poly(4-methyl-1-pentene) containing 0.3% N,N'-p-phenylenebis(2-naphthylamine) as antioxidant were cracked from an original inherent viscosity of 2.74 in a high vacuum at 280°. After 75 minutes, the inherent viscosity was reduced to 1.60; after two and a half hours, the inherent viscosity was 1.22. After cracking the polymer 16 hours, the inherent viscosity was reduced to 0.35.

EXAMPLE VII

A sample of poly(4-methyl-1-pentene) of inherent viscosity 2.1 was divided into two equal weight portions. Both portions were extracted with petroleum ether, the one portion (A) without any further treatment, the second one (B) after cracking it to an inherent viscosity of 1.35. During this cracking process, only 5% polymer was lost which proves that this heat-treatment does not split off 4-methyl-1-pentene from the ends of a long polymer chain but that the chains are cracked somewhere in the middle and substantially equally long chain portions remain, since breaking off monomers would result in much higher weight losses.

Repeated extractions of polymer (A) with petroleum ether gave 68.4% insoluble, crystalline material, while the crystalline fraction of the cracked polymer (B) was found to be 64.6%. The grease fractions were 29.7% in the uncracked and 34.4% in the cracked material.

Using ethyl ether, cyclohexane or acetone instead of petroleum ether gave almost identical results in the above extraction experiment.

This example demonstrates, that the ratio between crystalline and amorphous polymer remains substantially the same during the cracking operation. This, in other words, means that the polymer can be extracted before or after the cracking process, as long as the amorphous portion is removed completely by the solvent, since cracking does not create any amorphous portions and only breaks the crystalline polymer chains into shorter ones.

EXAMPLE VIII

Two samples of cracked cyclohexane-extracted poly-(4-methyl-1-pentene) were spun through a 0.015 inch diameter orifice at 250° C., carefully avoiding stretching during extrusion. With two different draw ratios, the two polymers gave the following fiber properties:

| Inh. Visc. | Draw Ratio | Tenacity | Elongation | Initial Modulus | Denier | Work Recovery 1/3/5 | Tensile Recovery 1/3/5 |
| --- | --- | --- | --- | --- | --- | --- | --- |
| 1.18 | 12X | 3.4 | 28 | 30 | 114 | 72/31/30 | 91/64/64 |
| 1.18 | 10X | 3.1 | 25 | 31 | 85 | 72/33/32 | 87/66/65 |
| 1.80 | 13X | 4.1 | 23 | 34 | 97 | 83/35/46 | 87/66/75 |
| 1.80 | 11X | 3.8 | 23 | 34 | 87 | 80/33/45 | 88/64/74 |

EXAMPLE IX

Example VI was repeated with an antioxidant-free sample of poly(4-methyl-1-pentene) of initial inherent viscosity 4.13. After cracking the polymer plug 1 hour at 270° C., the inherent viscosity measured 2.32; 2 hours at 270° C. decreased the inherent viscosity to 1.94; 4 hours to 1.80; 8 hours to 1.33, and 16 hours cracking gave a polymer of inherent viscosity 0.48.

EXAMPLE X

In a similar experiment, a poly(4-methyl-1-pentene) of inherent viscosity 4.13 containing 0.3% N,N'-p-phenylene bisphenylamine was cracked at 270° giving the folowing inherent viscosities after different elapsed time: 1 hour: 2.97, 2 hours: 2.34, 6 hours: 2.12, 8 hours: 1.38, and 16 hours: 0.98.

EXAMPLE XI

Example X was repeated with a poly(4-methyl-1-pentene) of inherent viscosity 2.30, the sample containing the same antioxidant. After 4 hours the inherent viscosity was reduced to 1.48, after 6 hours to 0.84, the cracking being carried out at 270° C. and below 1 mm. Hg pressure.

For the complete conversion of poly(4-methyl-1-pentene) into the spinnable range of inherent viscosity which produces highly orientable, strong fibers it has been found that neither cracking alone nor extracting alone is sufficient. However, a combination of these two steps will convert the major portion or all of the polymer into a viscosity suitable for melt extrusion and the resulting fiber can be oriented in a drawing step not possible in the presence of greasy, amorphous polymer. The suitable range for the inherent viscosity of the polymer is 0.8 to 1.6 or beyond these limits, the preferred range being 1.0 to 1.3. It is also recommended, to extract the polymerized 4-methyl-1-pentene first with the solvent such as chloroform, carbontetrachloride, ethyl ether, cyclohexane, linear hexane, petroleum ether, and the like solvents, and subsequently cracking the remaining polymer to a lower viscosity. These two steps can be carried out repeatedly, until all of the polymer is transferred into the desirable state for extrusion.

Cracking is carried out at a temperature from 250–310° C., the preferred range being from 270–290° C. The time for this cracking depends obviously on the initial inherent viscosity of the starting polymer, and on the temperature. This cracking step is preferably carried out in a high vacuum, to prevent oxidative deterioration or degradation of the polymer. Instead of carrying out this cracking procedure in a high vacuum, satisfactory results are obtained by cracking the polymer in an inert gas atmosphere.

Poly(4-methyl-1-pentene) of inherent viscosity suitable for melt extrusion, can be spun easily and smoothly through a 0.01 inch diameter or wider orifice at the temperature of 250–280° C., to yield a uniform, monofilament. This filament can be drawn up to 13 times its original as-spun length to yield a highly oriented fiber of outstanding tensile properties.

While the invention has been illustrated by cracking poly(4-methyl-1-pentene), comparable results can be obtained in treating any similar high inherent viscosity insoluble crystalline branched chain polymer of a monomer having the general formula $CH_2=CH-R$ in which R is a saturated hydrocarbon group of from 3 to 7 carbon atoms in which branching of the chain takes place on a carbon atom no more than two removed from the vinyl radical and the longest straight chain in the molecule does not exceed 7 carbon atoms. As R becomes increasingly greater than 3, solubility of the polymers also increases generally in solvents such as carbon tetrachloride, chloroform, chlorinated ethylene solvents and the like.

In general, the fibers described above were prepared by very slow processes, with the windup operating at a speed of 10 to 25 feet per minute. It was possible to windup more rapidly, in fact, up to 1500 feet per minute. Such a yarn, however, was already highly oriented due to the high spin-stretch factor, and could not be after-drawn.

Fibers made from cracked polymer and drawn in the usual manner have X-ray patterns and infrared spectra identical to the uncracked material proving that the polymer is the same and still an isotactic material. The crystalline melting point is still at about 235 to 240° C., the fiber stick temperature is 215° C. The fibers from poly(4-methyl-1-pentene) have, besides the aforesaid outstanding tensile strength, remarkable loop and knot properties. In addition, work recoveries under 1% elongation have been found as high as 84%, tensile recoveries, under the same stress, up to 89%. The same properties measured under 3% elongation have been found as high as 39% and 66% respectively.

The most surprising fact in the present invention is the manner in which the high molecular weight polymer is converted into polymer of suitable molecular weight for melt-extruding by thermal cracking. Instead of cleaving a monomer radical off the ends of the long polymer chains, the cracking breaks the individual chain into two or more shorter chains of substantially the same length. This stands in direct contrast to similar polymer cracking processes, e. g. for polystyrene, in which monomers are split off and a great portion or the entire polymer, cracked in this manner, is converted into monomeric material.

This fact can be used to advantage: the polymer can be freed from amorphous portions before the cracking process, during which the crystalline, insoluble polymer chains are converted into shorter crystalline chain lengths and no amorphous or very low molecular weight products are created. In other words, once the greasy portions are removed from the crystalline poly(4-methyl-1-pentene), the cracking will not create any more grease.

Another surprising fact of the described invention is the unforseeable improvement of poly(4-methyl-1-pentene) polymers by the combination of the two steps, extracting and cracking. Ordinarily, one would except, that tensile properties of fibers are to some degree a function of the polymeric chain length, and decreasing molecular weight gives poorer properties. In the foregoing description it has been shown that by cracking the molecular chains of poly(4-methyl-1-pentene), preceded or followed by extracting the greasy, amorphous and soluble portions, a crystalline insoluble polymer with high chemical resistance is obtained. This shorter chain polymer is melt-spinnable and gives drawn filamentary articles of far better physical properties than the untreated polymer as it is obtained from the various polymerization processes.

Since, in addition to the outstanding tensile properties, the fibers of the described polymer are of low density, mildew resistant, resistant to micro organisms, acids and bases, yet of low cost, the following uses are foreseen: Fish nets, tents, low cost shipping bags such as burlaps, tarpaulins, sails, shoe laces, tough ropes, floating cables, filter cloth for corrosive liquids at elevated temperature, as seat covers or convertible tops in the automotive industry, raincoats, etc. to name just a few of the various possibilities.

It will be apparent that many widely different embodiments of this invention may be made without departing from the spirit and scope thereof, and therefore it is not intended to be limited except as indicated in the appended claims.

I claim:

1. The process of reducing the inherent viscosity of crystalline polymers of a branched chain vinyl monomer having the formula $CH_2=CH-R$ in which R is a saturated hydrocarbon group of from 3 to 7 carbon atoms in which branching of the chain takes place on a carbon atom not more than 2 removed from the vinyl radical and the longest straight chain in the molecule does not exceed 7 carbon atoms and the said polymer or mixtures thereof have an inherent viscosity above about 2 and are reduced to a value within the range of about 0.8 to 1.6 which comprises the steps of cracking the polymeric material by subjecting the same to a temperature of from about 250° C. to 310° C. and extracting the grease portion from the polymer.

2. The process of claim 1 in which the inherent viscosity is reduced to about 1.0 to 1.3.

3. The process of claim 1 in which the polymer is cracked at a temperature of about 270° C. to 290° C.

4. The process of claim 1 in which the polymer is one of 4-methyl-1-pentene.

5. The process of claim 1 in which the inherent viscosity of the polymer before cracking and extracting is above 4.0.

6. The process of claim 1 in which the cracked polymer is extruded into the form of a fiber.

7. The process of claim 6 in which the fiber is drawn at least about 8×.

No references cited.